(12) United States Patent
Tafuru

(10) Patent No.: US 6,252,533 B1
(45) Date of Patent: Jun. 26, 2001

(54) DATA CONVERSION DEVICE

(75) Inventor: Toshihiro Tafuru, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/300,391

(22) Filed: Apr. 27, 1999

(30) Foreign Application Priority Data

Apr. 28, 1998 (JP) ................................. 10-118369

(51) Int. Cl.[7] ................................. H03M 1/66
(52) U.S. Cl. ................... 341/144; 341/155; 341/147; 341/152
(58) Field of Search ................... 341/144, 155, 341/118, 120, 141, 148, 147, 152

(56) References Cited

U.S. PATENT DOCUMENTS

| | | | | |
|---|---|---|---|---|
| 3,739,374 | * | 6/1973 | Kiowski | 341/152 |
| 3,905,030 | * | 9/1975 | Lavanant et al. | 341/152 |
| 4,400,692 | * | 8/1983 | Klein | 341/152 |
| 4,590,457 | * | 5/1986 | Amir | 341/152 |
| 4,829,416 | * | 5/1989 | Inaba et al. | 363/41 |
| 4,851,844 | * | 7/1989 | Akagiri | 341/144 |
| 4,992,792 | * | 2/1991 | Mori et al. | 341/152 |
| 5,059,977 | * | 10/1991 | Herman et al. | 341/144 |
| 5,646,620 | * | 7/1997 | Regier | 341/144 |
| 5,714,954 | * | 2/1998 | Chung et al. | 341/152 |
| 5,872,603 | * | 2/1999 | Ohsawa | 341/152 |
| 6,052,076 | * | 4/2000 | Patton, III et al. | 341/152 |

* cited by examiner

Primary Examiner—Howard L. Williams
Assistant Examiner—Jean Buner Jeanglaude
(74) Attorney, Agent, or Firm—Arent Fox Kintner Plotkin & Kahn, PLLC

(57) ABSTRACT

A data conversion device for synthesizing digital data composed of two or more components (of which each consists of a series of one-bit digital data) so as to output a single analog signal has: a switch circuit for selecting one of the components of the digital data at a time by dividing a predetermined period into intervals having predetermined lengths of time in accordance with a select signal; a timing generator for generating the select signal; a current feeding circuit for feeding a current that flows in one or another direction in accordance with the output of the switch circuit; and a current-to-voltage conversion circuit for converting the current into a voltage so as to produce an analog signal.

5 Claims, 7 Drawing Sheets

DATA CONVERSION DEVICE

BACKGROUND OF THE INVENTION

1. Field of the Invention

The present invention relates to a data conversion device that is used to synthesize digital data composed of two or more components, such as a DTMF (dual-tone multi-frequency) signal used in a push-button (i.e. tone-dialing) telephone, into a single analog signal.

2. Description of the Prior Art

Conventional examples of such data conversion devices are shown in FIGS. 1 and 2. FIGS. 1 and 2 are block diagrams of conventional data conversion devices that synthesize 1 kHz digital data 20, 10 kHz digital data 21, and 100 kHz digital data 22 into an analog signal OUT.

In the conventional data conversion device shown in FIG. 1, the 1 kHz digital data 20 is converted into an analog signal by a D/A (digital-to-analog) converter 23. The analog signal output from the D/A converter 23 is then amplified by an amplifier circuit 26 by a predetermined amplification factor and fed to an adder circuit 29. The 10 kHz digital data 21 is converted into an analog signal by a D/A converter 24. The analog signal output from the D/A converter 24 is then amplified by an amplifier circuit 27 by a predetermined amplification factor and fed to the adder circuit 29. The 100 kHz digital data 22 is converted into an analog signal by a D/A converter 25. The analog signal output from the D/A converter 25 is then amplified by an amplifier circuit 28 by a predetermined amplification factor and fed to the adder circuit 29. The adder circuit 29, by adding together the individual analog signals output from the amplifier circuits 26, 27, and 28, synthesizes those signals into a single analog signal OUT.

On the other hand, in the conventional data conversion device shown in FIG. 2, the 1 kHz digital data 20 is, while it is digital data, multiplied by a multiplier 30 so as to attain a predetermined amplification factor, and is then fed to an N-bit adder 33. The 10 kHz digital data 21 is multiplied by a multiplier 31 so as to attain a predetermined amplification factor, and is then fed to the N-bit adder 33. The 100 kHz digital data 22 is multiplied by a multiplier 32 so as to attain a predetermined amplification factor, and is then fed to the N-bit adder 33. The N-bit adder 33 adds together the digital data output from the multipliers 30, 31, and 32, and feeds the sum to a D/A converter 34. The D/A converter 34 converts the digital data fed thereto into an analog signal so as to output a single analog signal OUT. In this way, either of the data conversion devices shown in FIGS. 1 and 2 synthesizes digital data composed of three components 20, 21, and 22 of different frequencies into a single analog signal, while maintaining the frequencies of the components, and outputs the obtained single analog signal to a communications network, bus, or the like.

However, the conventional data conversion devices shown in FIGS. 1 and 2 have the following disadvantages. When digital data composed of a plurality of components is synthesized, the data conversion device shown in FIG. 1 requires amplifier circuits 26, 27, and 28 to attain a predetermined amplification factor for each signal component, and the data conversion device shown in FIG. 2 requires multipliers 30, 31, and 32 one for each signal component. Thus, these conventional data conversion devices require either large-scale hardware if their function is realized on a hardware basis or large-scale software if their function is realized on a software basis.

SUMMARY OF THE INVENTION

An object of the present invention is to provide a data conversion device that requires only small-scale hardware to convert digital data composed of two or more components into a single analog signal.

To achieve the above object, according to the present invention, a data conversion device for synthesizing digital data composed of two or more components (of which each consists of a series of one-bit digital data) so as to output a single analog signal is provided with: a switch circuit for selecting one of the components of the digital data at a time by dividing a predetermined period into intervals having predetermined lengths of time in accordance with a select signal; a timing generator for generating the select signal; a current feeding circuit for feeding a current that flows in one or another direction in accordance with the output of the switch circuit; and a current-to-voltage conversion circuit for converting the current into a voltage so as to produce an analog signal.

In this data conversion device, in accordance with the select signal output from the timing generator, the switch circuit selects one of the components of the digital data at a time by dividing a predetermined period into intervals having predetermined lengths of time. The data selected by the switch circuit is fed to the current feeding circuit. The current feeding circuit, in accordance with the data fed thereto, selects the direction of the current it outputs. The current output from the current feeding circuit is converted by the current-to-voltage conversion circuit into a voltage so as to be made into an analog signal. Thus, this data conversion device requires only a smaller-scale circuit than a conventional data conversion device, because it does not require a multiplier or amplifier circuit for each of the components of the digital data.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Hereinafter, an embodiment of the present invention will be described with reference to the accompanying drawings.

Figure 3:
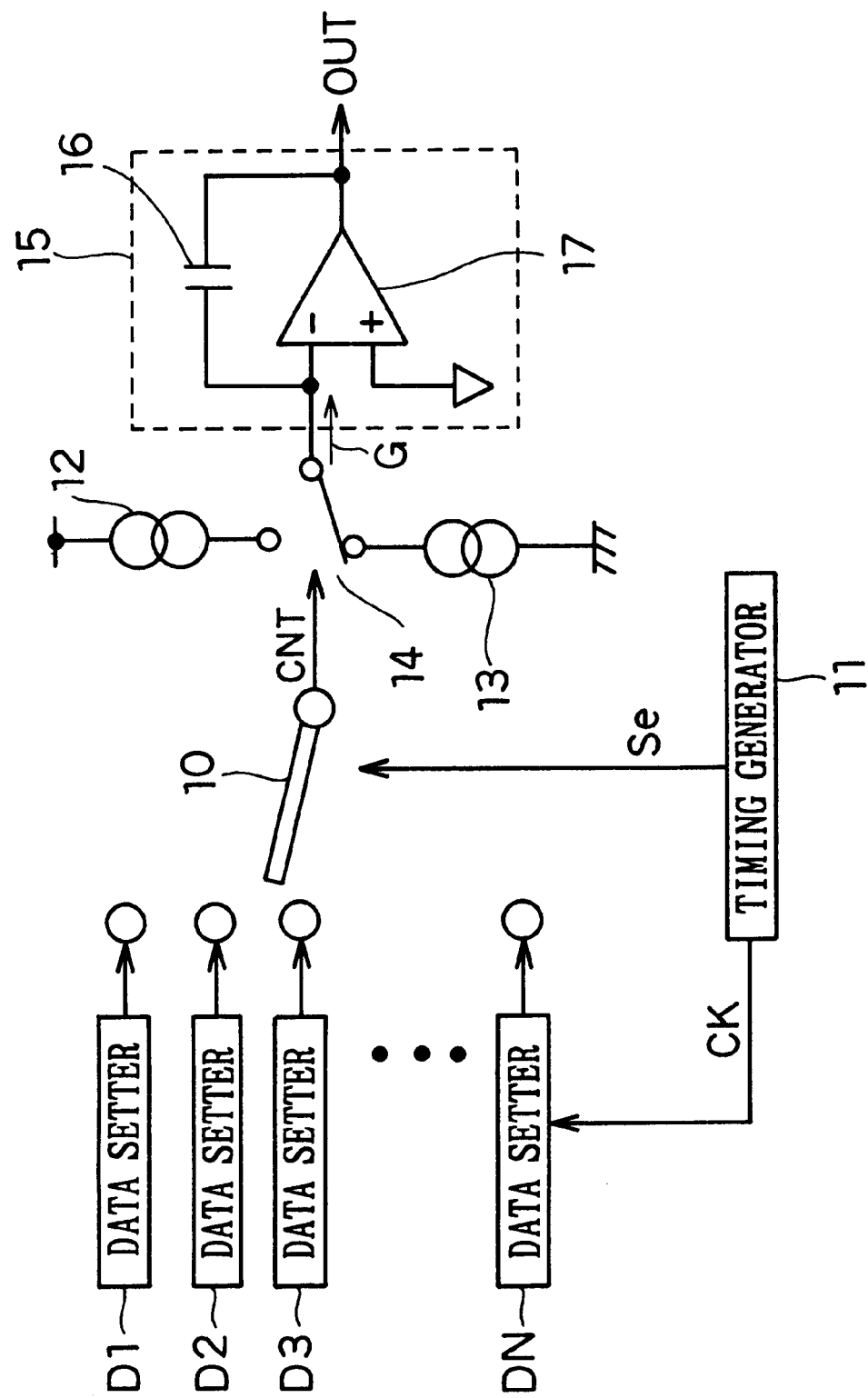
FIG. 3 is a block diagram of a data conversion device embodying the invention.

FIG. 3 shows a data conversion device embodying the invention that can synthesize digital data composed of N components. D1, D2, . . . , DN represent data setters that each store a series of one-bit digital data as results from delta modulation and that output the digital data bit by bit serially in synchronism with a clock CK.

Reference numeral 10 represents a switch circuit that selects one of the signals from the data setters D1, D2, . . . , DN in accordance with a switch select signal Se and outputs the selected signal as a control signal CNT. Reference numeral 11 represents a timing generator that outputs the clock CK and the switch select signal Se.

Reference numerals 12 and 13 represent current sources that are so configured as to output currents of the same magnitude. Reference numeral 14 represents a switch 14. When the control signal CNT is "1", the switch 14 is connected to the current source 12, and thus the current from the current source 12 causes a current to flow in the direction indicated by the arrow G. By contrast, when the control signal CNT is "0", the switch 14 is connected to the current source 13, and thus the current from the current source 13 causes a current to flow in the direction opposite to the arrow G.

Reference numeral 15 represents an integrating circuit that integrates the current fed thereto through the switch 14 from the current source 12 or 13 to convert it into an analog signal OUT. Reference numeral 17 represents an operational amplifier, which receives at its inverting input terminal (−) the current fed thereto through the switch 14 and receives at its non-inverting input terminal (+) a predetermined voltage. Reference numeral 16 represents a capacitor, which has one end connected to the inverting input terminal (−) of the operational amplifier 17 and has the other end connected to the output terminal of the operational amplifier 17. The analog signal OUT is output from the output terminal of the operational amplifier 17.

As will be described later, the switch select signal Se selects data by dividing the period of one cycle of the sampling clock CK into intervals having predetermined lengths of time in accordance with the ratio of the composition of the data. Thus, the control signal CNT is a signal obtained by dividing the period of one cycle of the clock CK into intervals having predetermined lengths of time in accordance with the ratio of the composition of the data. The switch 14 is controlled by the control signal CNT, and thereby the current fed to the integrating circuit 15 is controlled. Then, the integrating circuit 15 integrates the current fed thereto to convert it into the analog signal OUT. In this way, the data conversion device synthesizes a plurality of digital data stored in the data setters D1, D2, DN to output an analog signal OUT.

Figure 4:
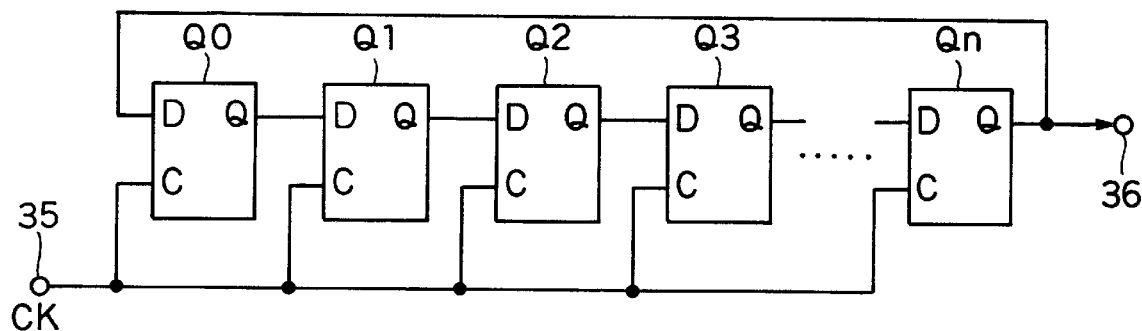
FIG. 4 is a circuit diagram showing the configuration of the data setter of the data conversion device of the embodiment.

FIG. 4 is a circuit diagram showing the configuration of the data setters D1, D2, . . . , DN. All of these data setters D1, D2, . . . , DN have the same configuration as shown in FIG. 4. Reference numeral 35 represents an input terminal at which the data setter receives the clock CK Q0 represents a D flip-flop, which receives at its clock input terminal (C) the clock CK. Q1 represents a D flip-flop, which has its input terminal (D) connected to the output terminal (Q) of the D flip-flop Q0 and receives at its clock input terminal (C) the clock CK.

Q2 represents a D flip-flop, which has its input terminal (D) connected to the output terminal (Q) of the D flip-flop Q1 and receives at its clock input terminal (C) the clock CK. Q3 represents a D flip-flop, which has its input terminal (D) connected to the output terminal (Q) of the D flip-flop Q2 and receives at its clock input terminal (C) the clock CK.

Qn represents a last-stage D flip-flop, which has its input terminal (D) connected to the output terminal (Q) of a last-but-one-stage D flip-flop Qn-1 (not shown) and receives at its clock input terminal (C) the clock CK. The output terminal (Q) of the D flip-flop Qn is connected to an output terminal 36, and also to the input terminal (D) of the D flip-flop Q0. Note that there may be any number n of D flip-flops in FIG. 4.

When the data setter is reset, the D flip-flops Q0 to Qn are set to output predetermined initial values, for example "10010 . . . 1". Thereafter, the values stored in the data setter are circulated by being shifted forward one position at a time in synchronism with the clock CK. As a result, in synchronism with the clock CK, the data output from the output terminal 36 changes like "1 . . . 010011 . . . 010011 . . . " The individual data setters D1, D2, . . . , DN may be set to different initial values. Moreover, the individual data setters D1, D2, . . . , DN may be provided with different numbers n of D flip-flops.

Figure 5:
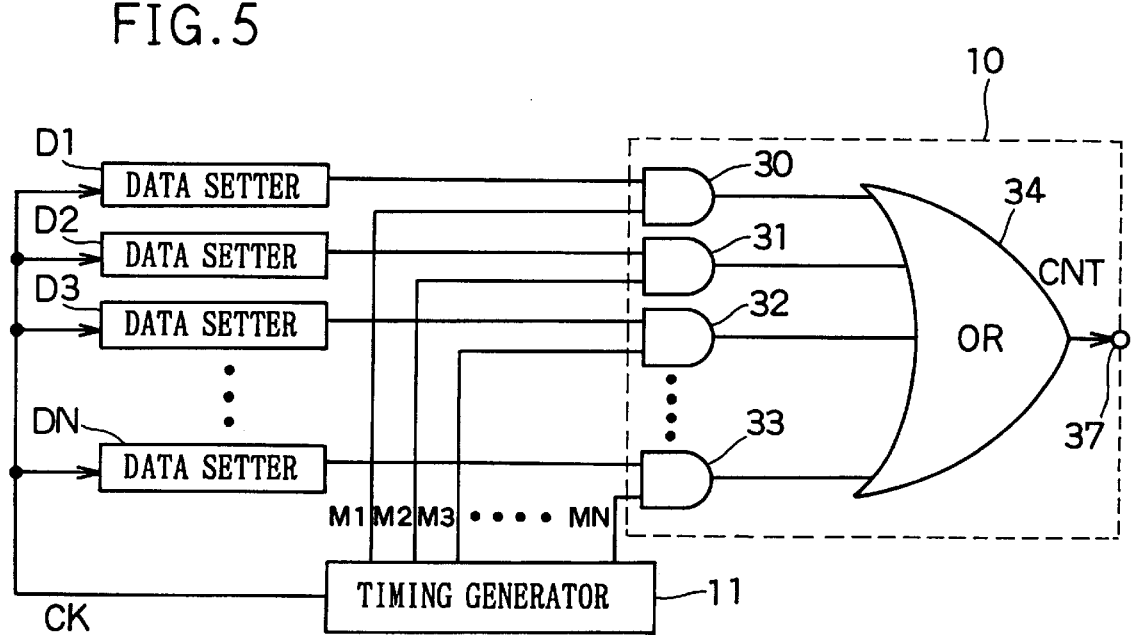
FIG. 5 is a circuit diagram showing the configuration of the switch circuit and the circuits around it of the data conversion device of the embodiment.

FIG. 5 is a circuit diagram showing the configuration of the switch circuit 10 and the circuits around it. Reference numeral 30 represents an AND circuit, which calculates the logical product between the signal fed thereto from the data setter D1 and a mask signal M1 fed thereto from the timing generator 11. Reference numeral 31 represents an AND circuit, which calculates the logical product between the signal fed thereto from the data setter D2 and a mask signal M2 fed thereto from the timing generator 11. Reference numeral 32 represents an AND circuit, which calculates the logical product between the signal fed thereto from the data setter D3 and a mask signal M3 fed thereto from the timing generator 11.

Reference numeral 33 represents an AND circuit, which receives a signal from the data setter DN and a mask signal MN from the timing generator 11. Similarly, all of the data setters, including those not shown in the figures, are provided with AND circuits that calculate the logical products between the signals fed thereto from the data setters and the mask signals fed thereto from the timing generator 11.

Figure 1:
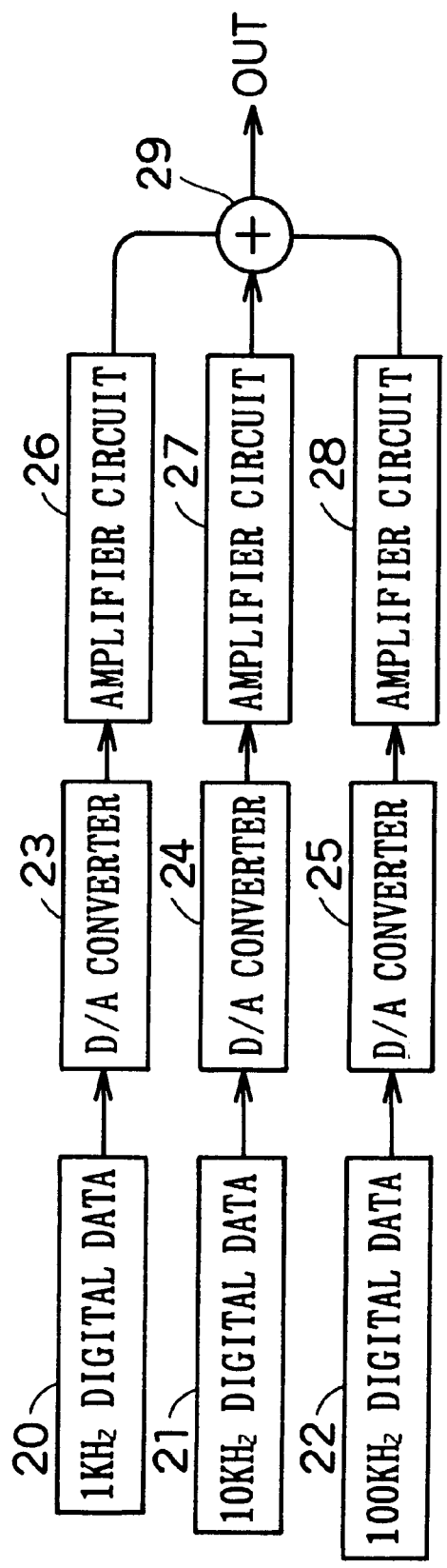
FIG. 1 is a block diagram showing an example of a conventional data conversion device.
Figure 2:
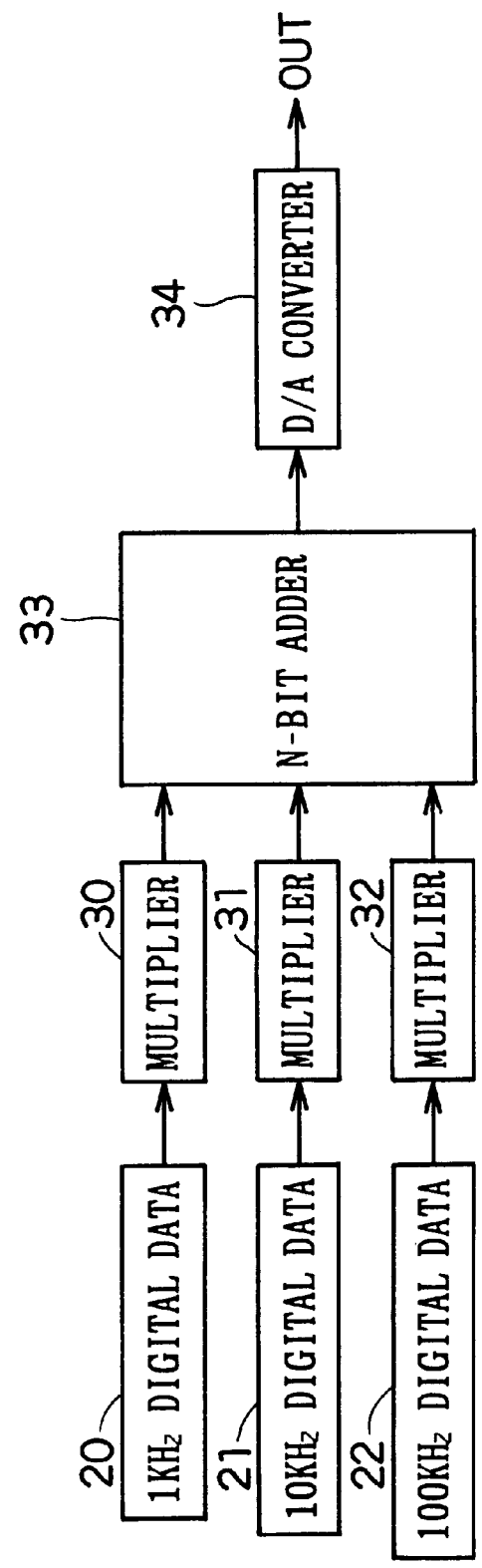
FIG. 2 is a block diagram showing another example of a conventional data conversion device.

Reference numeral 34 represents an OR circuit, which calculates the logical sum of the signals fed from a number N of AND circuits 30, 31, . . . , 33. The OR circuit 34 feeds the control signal CNT to an output terminal 37. Note that the mask signals M1, M2, . . . , MN correspond to the switch select signal Se shown in FIG. 1. In accordance with the mask signals M1, M2, . . . , MN, the switch circuit 10 determines whether to let the signals from the individual data setters D1, D2, . . . , DN pass therethrough or not.

Figure 6:
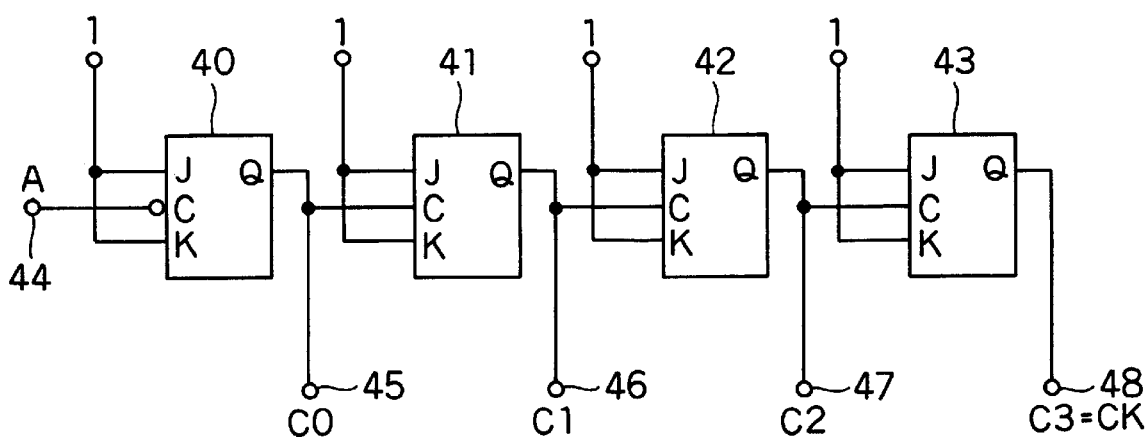
FIG. 6 is a circuit diagram showing the configuration of the counter incorporated in the timing generator of the data conversion device of the embodiment.

FIG. 6 is a circuit diagram showing the configuration of a four-bit counter incorporated in the timing generator 11. In accordance with the signals C0 to C3 output from this four-bit counter, the mask signals M1, M2, . . . , MN are generated. Reference numeral 44 represents an input terminal at which the four-bit counter receives the main clock A. Reference numeral 40 represents a JK flip-flop, which receives "1" at its input terminals (J) and (K), receives the main clock A at its clock input terminal (C), and feeds the signal C0 from its output terminal (Q) to an output terminal 45.

Reference numeral 41 represents a JK flip-flop, which receives "1" at its input terminals (J) and (K), receives the signal C0 at its clock input terminal (C), and feeds the signal C1 from its output terminal (Q) to an output terminal 46. Reference numeral 42 represents a JK flip-flop, which receives "1" at its input terminals (J) and (K), receives the signal C1 at its clock input terminal (C), and feeds the signal C2 from its output terminal (Q) to an output terminal 47. Reference numeral 43 represents a JK flip-flop, which receives "1" at its input terminals (J) and (K), receives the signal C2 at its clock input terminal (C), and feeds the signal C3 from its output terminal (Q) to an output terminal 48. The signal C3 is used also as the clock CK.

Figure 7:
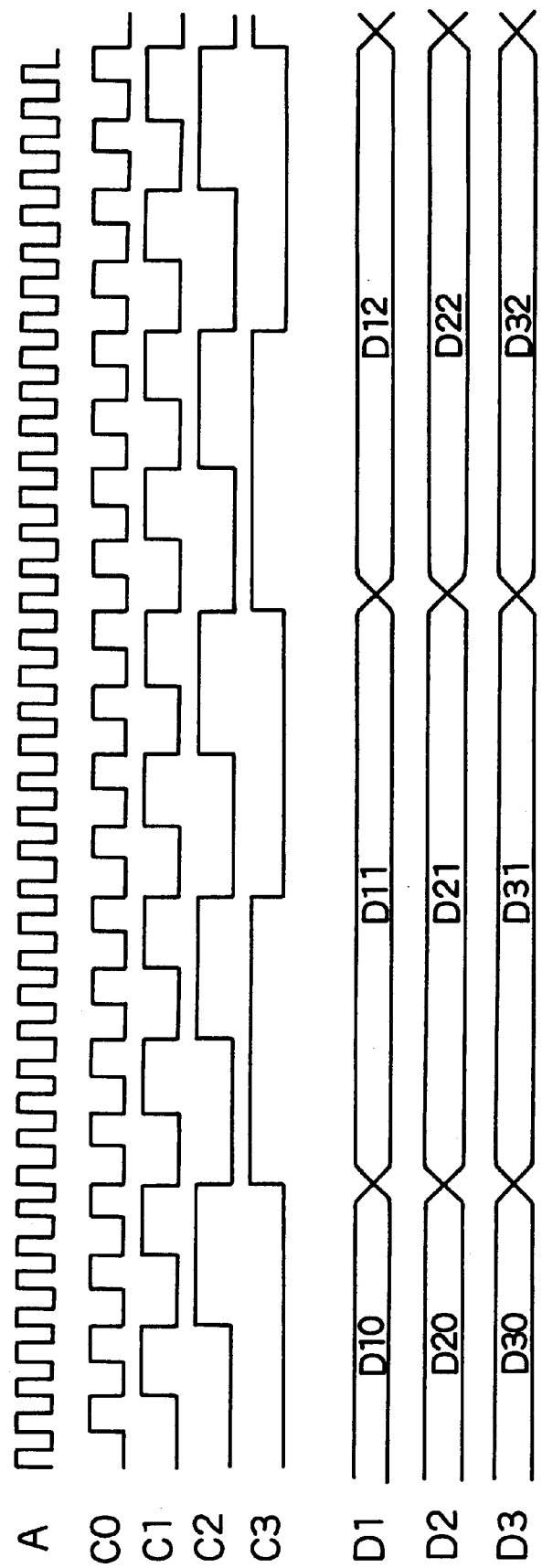
FIG. 7 is a waveform diagram illustrating the operation of the counter and the data setter of the data conversion device of the embodiment.

FIG. 7 is a waveform diagram illustrating the operation of the four-bit counter shown in FIG. 6. At a rising edge of the main clock A, the JK flip-flop inverts the signal C0. At a trailing edge of the signal C0, the JK flip-flop 41 inverts the signal C1. At a trailing edge of the signal C1, the JK flip-flop 42 inverts the signal C2. At a trailing edge of the signal C2, the JK flip-flop 43 inverts the signal C3. As a result, the signals C0 to C3 represent the pulse count in the main clock A.

The signal C3 is, as the clock CK, fed to the data setters D1, D2, ..., DN. Accordingly, the data setters D1, D2, ..., DN simultaneously shift forward the data at a rising edge of the signal C3. As a result, at a rising edge of the signal C3, the data setter D1 outputs signals D10, D11, and D12. At a rising edge of the signal C3, the data setter D2 outputs signals D20, D21, and D22. At a rising edge of the signal C3, the data setter D3 outputs signals D30, D31, and D32.

Figure 8:
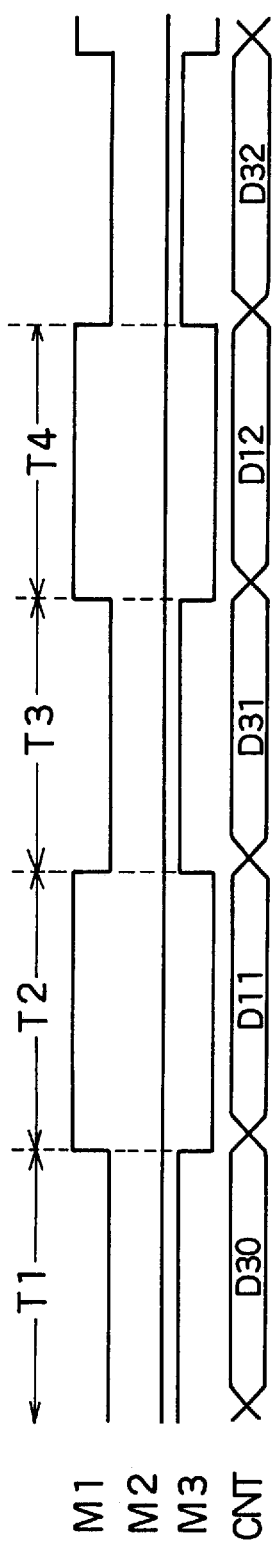
FIG. 8 is a waveform diagram illustrating the operation of the switch circuit of the data conversion device of the embodiment, as observed when the data from the data setters D1 and D3 is synthesized in the ratio of 50%:50%.

FIG. 8 is a diagram illustrating how the mask signals M1 to M3 and the control signal CNT change in a case where the mask signal M1 is obtained by using the signal C3 intact, the mask signal M3 is obtained by inverting the signal C3, and the other mask signals are kept "0" throughout. During the period T1, only the mask signal M3 is "1", and the other mask signals are "0". Accordingly, the AND circuit 32 outputs the signal fed thereto from the data setter D3, and the AND circuits that are connected to the other data setters output "0". As a result, only the signal from the data setter D3 is fed to the OR circuit 34, and the signals from the other data setters are masked by the AND circuit. Thus, the signal D30 from the data setter D3 is used as the control signal CNT.

During the next period T2, only the mask signal M1 is "1", and the other mask signals are "0". The mask signal M1 rises at the start of the period T2. At this time, since the clock CK has already risen, the data setters D1, D2, ..., DN simultaneously shift the data. During the period T2, the AND circuit 30 outputs the signal fed thereto from the data setter D1, and the AND circuits that are connected to the other data setters output "0". As a result, only the signal from the data setter D1 is fed to the OR circuit 34, and the signals from the other data setters are masked. Thus, the signal D11 from the data setter D1 is used as the control signal CNT.

During the next period T3, only the mask signal M3 is "1", and the other mask signals are "0". Thus, the signal D31 from the data setter D3 is used as the control signal CNT.

During the next period T4, only the mask signal M1 is "1", and the other mask signals are "0". The mask signal M1 rises at the start of the period T4. At this time, the data setters D1, D2, ..., DN simultaneously shift the data. During the period T4, the signal D12 from the data setter D1 is used as the control signal CNT. Thereafter, the switch circuit 10 outputs alternatively the data from the data setter D1 and the data from the data setter D3 as the control signal CNT.

In this way, the switch circuit 10 divides the period of one cycle of the clock CK into two intervals each having 50% of the length of the whole period, and thereby switches the control signal CNT between the signal from the data setter D1 and the signal from the data setter D3. Then, in accordance with the control signal CNT, the switch 14 selects the direction of the current fed to the integrating circuit 15. The integrating circuit 15 integrates the current fed thereto through the switch 14 to convert it into the analog signal OUT. In this way, by switching data by dividing the period of one cycle of a sampling clock, it is possible to synthesize digital data composed of two components into a single analog signal OUT.

Figure 9:
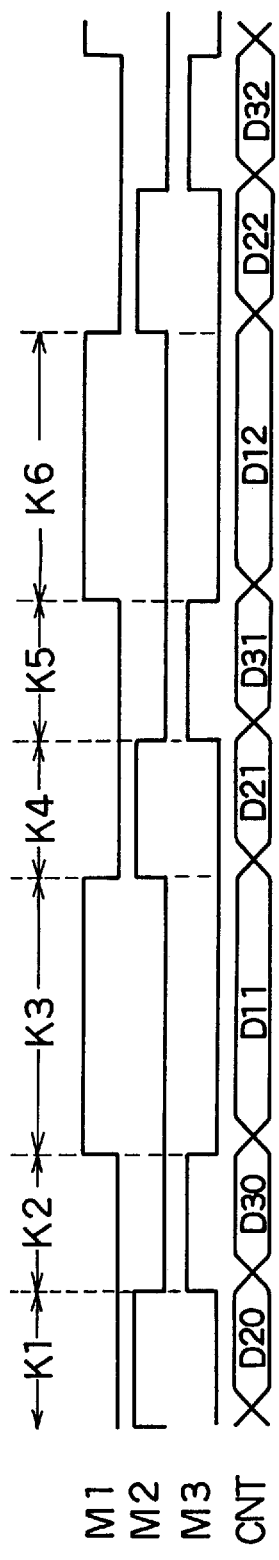
FIG. 9 is a waveform diagram illustrating the operation of the switch circuit of the data conversion device of the embodiment, as observed when the data from the data setters D1, D2, and D3 is synthesized in the ratio of 50%:25%:25%.

FIG. 9 is a diagram illustrating how the mask signals M1 to M3 and the control signal CNT change in a case where the mask signal M1 is obtained by using the signal C3 intact, the mask signal M2 is obtained by inverting the signal C2 and masking the resultant signal so as not to be "1" when the signal M1 is "1", the mask signal M3 is obtained by using the signal C2 and masking it so as not to be "1" when the signal M1 is "1", and the other mask signals are kept "0" throughout. During the period K1, only the mask signal M2 is "1", and the other mask signals are "0". Accordingly, the AND circuit 31 outputs the signal fed thereto from the data setter D2, and the AND circuits that are connected to the other data setters output "0". As a result, only the signal from the data setter D3 is fed to the OR circuit 34, and the signals from the other data setters are masked by the AND circuit. Thus, the signal D20 from the data setter D2 is used as the control signal CNT. The period K1 corresponds to 25% of the period of one cycle of the clock CK.

During the next period K2, only the mask signal M3 is "1", and the other mask signals are "0". Thus, the signal D30 from the data setter D3 is used as the control signal CNT. The period K2 corresponds to 25% of the period of one cycle of the clock CK. During the next period K3, only the mask signal M1 is "1", and the other mask signals are "0". At this time, since the clock CK has already risen at the start of the period K3, the data setters D1, D2, ..., DN simultaneously shift the data. During the period K3, the signal D11 from the data setter D1 is used as the control signal CNT. The period K3 corresponds to 50% of the period of one cycle of the clock CK.

During the next period K4, only the mask signal M2 is "1", and the other mask signals are "0". Thus, the signal D21 from the data setter D2 is used as the control signal CNT. During the next period K5, only the mask signal M3 is "1", and the other mask signals are "0". Thus, the signal D31 from the data setter D3 is used as the control signal CNT.

During the next period K6, only the mask signal M1 is "1", and the other mask signals are "0". Accordingly, at the start of the period K6, the data setters D1, D2, ..., DN simultaneously shift the data. Thus, during the period K6, the signal D12 from the data setter D1 is used as the control signal CNT. Thereafter, the switch circuit 10 switches among the data from the data setters D1, D2, and D3 to output the control signal CNT. In this way, the data conversion device synthesizes the data of three components from the data setters D1, D2, and D3 in the ratio of 50%:25%:25% to output the signal OUT As described above, it is possible to generate the mask signals M1, M2, ..., MN by combining the signals C0 to C3 in such a way that, of the mask signals M1, M2, ..., MN, two or more will not be "1" at the same time and that at least one will be "1" at a time. In particular, with a DTMF signal as used in a push-button telephone network, the data conversion device simply needs to synthesize digital data composed of two components.

The counter may be configured in any way other than shown in FIG. 6, as long as it can produce signals C0 to C3 as shown in FIG. 7. A data composition ratio that is too fine to be coped with by a four-bit counter can be coped with by increasing the number of bits that the counter can handle.

The integrating circuit 15 may be configured in any way other than shown in FIG. 3, as long as it can convert a current into a voltage.

As described above, the data conversion device of the embodiment described above can synthesize digital data composed of a plurality of components, such as results from delta modulation, into a single analog signal OUT by combining the components in the ratio determined by the intervals of time allotted thereto.

In the data conversion device of the embodiment, the longer the interval of time in which a component of digital data is selected by the switch circuit 10 within the period of one cycle of the sampling clock CK, the longer the interval of time in which that component appears in the signal OUT. For example, in FIG. 9, where the data from the data setters D1, D2, and D3 is synthesized in the ratio of 50%:25%:25%, the signal component corresponding to the data from the data setter D1 occupies a larger proportion of the signal OUT than the signal components corresponding to the data from the data setters D2 and D3. In this way, the amplification factor for each signal component can be adjusted simply by adjusting the timing with which the timing generator 11 performs time division; that is, there is no need to use any amplifier circuit or multiplier. Moreover, since there is no need to provide an amplifier circuit or multiplier for each component of digital data, the data conversion device can be realized in a small-scale circuit.

In the embodiment described above, the data conversion device synthesizes digital data resulting from delta modulation. However, also with digital data resulting from adaptive delta modulation, it is possible to synthesize signals resulting from adaptive delta modulation into a single analog signal by controlling the magnitude and others of the current obtained from a current source in compliance with adaptive delta modulation and then integrating the current output from the current source by the use of an integrating circuit.

What is claimed is:

1. A data conversion device comprising:
   a plurality of data setters that update output data thereof at every period of a clock fed thereto;

a switch circuit for selecting an output of one of the plurality of data setters every time the switch receives a select signal;

a timing generator for time-dividing one period of the clock into intervals according to data synthesis proportions and generating the select signal at every such interval to switch the switch;

a current feeding circuit for feeding a current that flows in one or another direction in accordance with an output of the switch circuit; and a current-to-voltage conversion circuit for converting the current into a voltage so as to produce an analog signal.

2. A data conversion device as claimed in claim 1, wherein the select signal is a signal consisting of a plurality of bits of which only one is "1" and the others are "0", and the switch circuit comprises AND circuits for calculating a logical product between bits of each of the components of the digital signal and the bits of the select signal and an OR circuit for calculating a logical sum of outputs of the AND circuits.

3. A data conversion device as claimed in claim 2, wherein the timing generator incorporates a counter for counting pulses in a clock and outputs the select signal in accordance with an output of the counter.

4. A data conversion device as claimed in claim 1, wherein the data setter comprises a plurality of D flip-flops, the D flip-flops forming a loop by being connected in such a way that an output of one D flip-flop is fed to another D flip-flop.

5. A data conversion device as claimed in claim 1 wherein the current-to-voltage conversion circuit comprises an operational amplifier and a capacitor having a first end connected to one of input terminals of the operational amplifier and having a second end connected to an output terminal of the operational amplifier, the capacitor receiving at its first end the current output from the current feeding circuit.

* * * * *